US010801788B2

(12) United States Patent
Li et al.

(10) Patent No.: US 10,801,788 B2
(45) Date of Patent: Oct. 13, 2020

(54) LEAD-SUPERCRITICAL CARBON DIOXIDE INTERMEDIATE HEAT EXCHANGER

(71) Applicant: XI'AN JIAOTONG UNIVERSITY, School of Energy and Power Engineering, Xi'an (CN)

(72) Inventors: Mingjia Li, Xi'an (CN); Hanhui Zhu, Xi'an (CN); Yaling He, Xi'an (CN); Wenquan Tao, Xi'an (CN)

(73) Assignee: Mingjia Li, Xi'an (CN)

( * ) Notice: Subject to any disclaimer, the term of this patent is extended or adjusted under 35 U.S.C. 154(b) by 172 days.

(21) Appl. No.: 16/168,388

(22) Filed: Oct. 23, 2018

(65) Prior Publication Data
US 2020/0072560 A1   Mar. 5, 2020

(30) Foreign Application Priority Data
Sep. 5, 2018   (CN) .......................... 2018 1 1029979

(51) Int. Cl.
*F28F 3/00*  (2006.01)
*F28F 3/04*  (2006.01)

(52) U.S. Cl.
CPC .......... *F28F 3/048* (2013.01); *F28F 2260/02* (2013.01)

(58) Field of Classification Search
CPC ... F28F 3/048; F28F 2260/02; H01M 8/04067
USPC .................................................. 165/164, 166
See application file for complete search history.

(56) References Cited

U.S. PATENT DOCUMENTS

| | | | | |
|---|---|---|---|---|
| 2,418,191 A | * | 4/1947 | Parrish ................. | F28D 9/0012 165/156 |
| 2,432,929 A | * | 12/1947 | Parrish ................. | B64D 13/08 126/116 R |
| 2,663,549 A | * | 12/1953 | Otten ...................... | F28D 9/04 165/163 |
| 3,129,756 A | * | 4/1964 | Ramen ..................... | F22D 1/02 165/157 |
| 3,224,187 A | * | 12/1965 | Breihan ................... | F03G 6/06 60/526 |
| 3,610,330 A | * | 10/1971 | Nasser ..................... | F28F 9/02 165/158 |
| 3,928,300 A | * | 12/1975 | Hagberg ................. | B01D 3/06 528/501 |

(Continued)

*Primary Examiner* — Claire E Rojohn, III
(74) *Attorney, Agent, or Firm* — Dragon Sun Law Firm, PC; Jinggao Li, Esq.

(57) ABSTRACT

The present disclosure discloses a lead-supercritical carbon dioxide intermediate heat exchanger, including four modular printed circuit board heat exchangers (modular PCHEs), a cylinder, vertical partition boards, horizontal partition boards and heat exchange fluid channels. $S-CO_2$ fluid flows upward along microchannels in PCHE cold side heat exchange plates after reaching the bottom of the cylinder along a square central down tube formed by the four PCHEs to absorb heat from hot side heat exchange plates. $S-CO_2$ leaves the intermediate heat exchanger upward after being collected by a current collector at the other end of each PCHE. Liquid lead enters microchannels in the PCHE hot side heat exchange plates from a duct at the upper end of the cylinder to transfer heat to $S-CO_2$ on the other side, and then flows out of the intermediate heat exchanger from a duct at the lower end of the cylinder to complete heat exchange.

8 Claims, 4 Drawing Sheets

(56) References Cited

U.S. PATENT DOCUMENTS

| | | | | |
|---|---|---|---|---|
| 4,153,501 A * | 5/1979 | Fink | F28F 7/02 | 159/49 |
| 4,423,767 A * | 1/1984 | Hay, II | F28D 7/103 | 165/140 |
| 4,808,262 A * | 2/1989 | Aneja | B01D 1/221 | 159/47.1 |
| 4,910,100 A * | 3/1990 | Nakanishi | H01M 8/025 | 429/423 |
| 6,221,522 B1 * | 4/2001 | Zafred | H01M 8/0252 | 429/434 |
| 6,485,852 B1 * | 11/2002 | Miller | F28D 9/0018 | 422/198 |
| 6,492,050 B1 * | 12/2002 | Sammes | H01M 8/0271 | 429/423 |
| 6,627,040 B1 * | 9/2003 | Elsner | F28D 9/0018 | 159/47.1 |
| 7,655,337 B2 * | 2/2010 | Kaye | H01M 8/0267 | 429/424 |
| 7,674,543 B2 * | 3/2010 | Chiang | H01M 8/0254 | 429/425 |
| 8,163,433 B2 * | 4/2012 | Zafred | H01M 8/0252 | 429/466 |
| 8,304,122 B2 * | 11/2012 | Poshusta | H01M 8/04089 | 429/408 |
| 9,287,572 B2 * | 3/2016 | Weingaertner | H01M 8/0618 | |
| 9,537,165 B2 * | 1/2017 | Ogawa | F28D 7/0066 | |
| 2003/0054215 A1 * | 3/2003 | Doshi | H01M 8/2432 | 429/423 |
| 2004/0081872 A1 * | 4/2004 | Herman | H01M 8/04014 | 429/413 |
| 2006/0127725 A9 * | 6/2006 | Sarkar | H01M 8/02 | 429/423 |
| 2008/0081233 A1 * | 4/2008 | Rechberger | F28D 7/0075 | 429/423 |
| 2008/0261108 A1 * | 10/2008 | Jeong | H01M 2/046 | 429/164 |
| 2009/0035620 A1 * | 2/2009 | Finnerty | H01M 8/004 | 429/513 |
| 2009/0087707 A1 * | 4/2009 | Indersie | F28D 7/103 | 429/423 |
| 2009/0280370 A1 * | 11/2009 | Dan | H01M 8/04089 | 429/411 |
| 2010/0025024 A1 * | 2/2010 | Meshenky | F28F 3/025 | 165/164 |
| 2010/0084111 A1 * | 4/2010 | Jaeger | F28F 9/0219 | 165/41 |
| 2010/0170210 A1 * | 7/2010 | McClanahan | B01D 45/06 | 55/434.4 |
| 2010/0175983 A1 * | 7/2010 | Batty | C02F 1/12 | 203/24 |
| 2010/0263841 A1 * | 10/2010 | Corry | F28F 9/00 | 165/133 |
| 2010/0295391 A1 * | 11/2010 | Perkins | B60K 6/48 | 310/64 |
| 2011/0177409 A1 * | 7/2011 | Yen | C01B 3/386 | 429/423 |
| 2011/0272124 A1 * | 11/2011 | Perez | F28F 9/22 | 165/164 |
| 2012/0009498 A1 * | 1/2012 | Ogawa | H01M 8/248 | 429/455 |
| 2012/0178003 A1 * | 7/2012 | Venkataraman | F28F 9/02 | 429/408 |
| 2013/0164646 A1 * | 6/2013 | Kobayashi | H01M 8/241 | 429/434 |
| 2014/0106253 A1 * | 4/2014 | Drouhault | H01M 8/04067 | 429/436 |
| 2014/0196875 A1 * | 7/2014 | Jensen | B01J 8/0285 | 165/154 |
| 2015/0114611 A1 * | 4/2015 | Morris | F02C 7/10 | 165/166 |
| 2016/0025418 A1 * | 1/2016 | Devedeux | F02B 29/0462 | 165/166 |
| 2016/0099476 A1 * | 4/2016 | Palumbo | H01M 8/2484 | 429/434 |
| 2016/0169597 A1 * | 6/2016 | Nehlen, III | F28F 9/0229 | 165/166 |
| 2017/0234622 A1 * | 8/2017 | Mizushita | F28F 3/08 | 165/166 |
| 2020/0071191 A1 * | 3/2020 | Schubert | C02F 1/043 | |
| 2020/0072560 A1 * | 3/2020 | Li | F28F 3/048 | |
| 2020/0168935 A1 * | 5/2020 | Weingaertner | H01M 8/04126 | |

\* cited by examiner

LEAD-SUPERCRITICAL CARBON DIOXIDE INTERMEDIATE HEAT EXCHANGER

CROSS-REFERENCE TO RELATED PATENT APPLICATION

This application claims priority to and the benefit of Chinese Patent Application Serial No. 201811029979.X, filed Sep. 5, 2018, entitled "Lead-Supercritical Carbon Dioxide Intermediate Heat Exchanger" by Mingjia LI et al. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the invention described herein. All references cited and discussed in this specification are incorporated herein by reference in their entireties and to the same extent as if each reference was individually incorporated by reference.

TECHNICAL FIELD

The present disclosure relates to the fourth generation of advanced nuclear power technology, and particularly relates to a lead-supercritical carbon dioxide intermediate heat exchanger applied to a lead-based reactor supercritical carbon dioxide ($S-CO_2$) cycle power generation system.

BACKGROUND

In China, primary energy consumption is mainly coal, and the massive consumption of fossil energy has caused serious environmental pollution, making China face the challenges of deteriorating ecological environment and exhaustion of energy resources. In order to solve the energy and environmental problems, the government has made the decision to develop nuclear power technology efficiently and speed up the construction of nuclear power projects under the premise of safety. In order to improve the economical efficiency and safety of nuclear power and the reusing rate of fuel and solve the problems of nuclear waste disposal and nuclear proliferation more thoroughly, the fourth generation of nuclear power technology aimed to bear the basic power load with high efficiency, low cost, stable power output and low waste generation from resource utilization is being studied worldwide. The lead-based reactor has attracted extensive attention and research as one of the main candidate reactor types for the fourth generation of advanced nuclear reactor power generation system and accelerator driven subcritical (ADS) nuclear energy system. In order to meet the development needs of high efficiency, modularization and miniaturization of the lead-based reactor power generation system, it is urgent to develop a new cycle form of high efficiency, compactness and economical efficiency in the lead-based reactor system.

The power cycle constructed with supercritical carbon dioxide ($S-CO_2$) as working medium has become a hot research topic in recent years, and is one of the thermal power conversion schemes with great application prospects. The $S-CO_2$ Brayton cycle has a high efficiency, good stability, a simple system and small device sizes, which can improve the safety, economical efficiency and compactness of a power conversion system. Therefore, applying the $S-CO_2$ cycle to the lead-based reactor power generation system is an important research topic in the field of nuclear power in recent years. The lead-based reactor $S-CO_2$ cycle power generation system consists of a lead-based reactor heat source, a lead/$S-CO_2$ intermediate heat exchanger and a $S-CO_2$ cycle subsystem, wherein the lead/$S-CO_2$ intermediate heat exchanger is a key heat exchange device for transferring heat released from a lead-based reactor to the $S-CO_2$ cycle subsystem for thermal power conversion. Using a highly efficient and compact lead/$S-CO_2$ intermediate heat exchanger technology is an effective way to improve the fuel utilization rate, compactness and economical efficiency of a lead-based reactor power generation system. However, the design method of a lead/$S-CO_2$ intermediate heat exchanger is not yet mature. At the same time, a traditional shell-and-tube lead/$S-CO_2$ intermediate heat exchanger has the disadvantages of low design efficiency and large space size due to the fact that the $S-CO_2$ cycle runs at high temperature and high pressure.

Therefore, an unaddressed need exists in the art to address the aforementioned deficiencies and inadequacies. It is necessary to propose a new, efficient and compact lead/$S-CO_2$ intermediate heat exchanger.

SUMMARY

In order to overcome the above-mentioned shortcomings of the prior art, it is an object of the present disclosure to provide a lead-supercritical carbon dioxide intermediate heat exchanger with high efficiency and high compactness, which is applied to a lead-based reactor $S-CO_2$ cycle power generation system.

In order to achieve the above object, the technical scheme adopted by the present disclosure is as follows: the lead-supercritical carbon dioxide intermediate heat exchanger comprises a cylinder and four modular printed circuit board heat exchangers (modular PCHEs) uniformly arranged around the central axis of the cylinder, wherein the four modular PCHEs form a $S-CO_2$ central down tube at the center, the top end of the $S-CO_2$ central down tube communicates with a $S-CO_2$ inlet pipe sleeved in the cylinder, and the cylinder is provided with a liquid lead inlet channel and a liquid lead outlet channel; the cylinder is provided with annular upper and lower vertical partition boards which isolate the liquid lead inlet and outlet channels on and below the PCHEs respectively; the upper end of each modular PCHE is provided with a $S-CO_2$ outlet pipe and a liquid lead inlet pipe, and the lower end is provided with a $S-CO_2$ inlet pipe and a liquid lead outlet pipe; and the $S-CO_2$ outlet pipes and the $S-CO_2$ inlet pipes are positioned inside the upper and lower vertical partition boards respectively and communicate with the $S-CO_2$ central down tube and the $S-CO_2$ outlet channel respectively, and the liquid lead inlet pipes and the liquid lead outlet pipes are positioned outside the upper and lower vertical partition boards respectively and communicate with the liquid lead inlet channel and the liquid lead outlet channel respectively.

The modular PCHE is formed by alternate stacking and diffusion welding of a plurality of cold/hot plates etched with semicircular microchannels, and the cold/hot plates are made of SS316 stainless steel.

The inlet end of the modular PCHE is provided with a current equalizer, the outlet end is provided with a current collector, the current equalizer at the upper end is connected with the liquid lead inlet pipe, the current equalizer at the lower end is connected with the $S-CO_2$ inlet pipe, the current collector at the upper end is connected with the $S-CO_2$ outlet pipe, and the current collector at the lower end is connected with the liquid lead outlet pipe.

The upper part of the cylinder is provided with a S-CO$_2$ outlet channel, the S-CO$_2$ outlet channel is located at the tops of the modular PCHEs, the inside of the liquid lead inlet channel and the outside of the S-CO$_2$ inlet pipe, and S-CO$_2$ flowing out of the S-CO$_2$ outlet pipe flows upward along the S-CO$_2$ outlet channel and finally exits the S-CO$_2$ horizontal outlet pipe at the top of the S-CO$_2$ outlet channel.

The bottom of the cylinder is a closed conical structure.

An upper horizontal partition board is arranged between the upper ends of adjacent modular PCHEs, a lower horizontal partition board is arranged between the lower ends of adjacent modular PCHEs, the upper vertical partition board divides the upper horizontal partition board into an upper inner horizontal partition board and an upper outer horizontal partition board, and the lower vertical partition board divides the lower horizontal partition board into a lower inner horizontal partition board and a lower outer horizontal partition board.

The cross sections of the S-CO$_2$ central down tube and the S-CO$_2$ inlet pipe are square, and the bottom end of the S-CO$_2$ central down tube is connected with a S-CO$_2$ cavity composed of the lower vertical partition board, the bottom of the cylinder and the lower inner horizontal partition boards.

The liquid lead inlet channel is arranged at the tops of the modular PCHEs and is formed by welding the upper vertical partition board, the cylinder and the upper outer horizontal partition boards.

The liquid lead outlet channel is arranged at the bottom of the cylinder and is formed by welding the cylinder, the lower outer horizontal partition boards and the lower vertical partition board.

Compared with an existing shell-and-tube type lead/S-CO$_2$ intermediate heat exchanger, the present disclosure has the advantages that:

(1) the present disclosure comprehensively considers the particularity of the high-temperature and high-pressure operation condition of the cold side S-CO$_2$ fluid of the lead/S-CO$_2$ intermediate heat exchanger, adopts the modular PCHE (efficient, compact, and high-temperature and high-pressure resistant) to replace a traditional shell-and-tube heat exchanger for heat exchange, greatly improves the heat exchange efficiency and compactness of the lead/S-CO$_2$ intermediate heat exchanger, and meets the development requirements of high efficiency, modularization and miniaturization of a lead-based reactor power generation system;

(2) since the PCHE has the maximum size limit, the heat exchange power is limited by directly using the PCHE as a lead/S-CO$_2$ intermediate heat exchanger, and the present disclosure is assembled by using four modular PCHEs, which can realize larger heat exchange power;

(3) the present disclosure can have different modular PCHE structures and sizes according to different heat exchange requirements, and has the characteristics of flexible assembly of power, good sealing performance and high safety; and (4) the present disclosure can provide a reference for the optimal design of the lead/S-CO2 intermediate heat exchanger, for example, the quantity and layout of the internal modular PCHEs of the lead/S-CO2 intermediate heat exchanger can be optimized, and the number and size of microchannels on cold side and hot side heat exchange plates in the modular PCHE can be optimized to achieve good temperature matching of cold and hot fluids and improve heat exchange efficiency, so as to develop a more efficient and compact lead/S-CO2 intermediate heat exchanger.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

In the figures, 1—modular printed circuit board heat exchanger PCHE; 2—cylinder; 3—lower vertical partition board; 4—square S-CO$_2$ central down tube; 5—S-CO$_2$ outlet channel; 6—upper vertical partition board; 7—S-CO$_2$ inlet pipe; 8—lead inlet channel; 9—lead outlet channel; 10—upper inner horizontal partition board; 11—upper outer horizontal partition board; 12—S-CO$_2$ outlet pipe; 13—liquid lead inlet pipe; 14—lower inner horizontal partition board; 15—lower outer horizontal partition board; 16—S-CO$_2$ inlet pipe; 17—liquid lead outlet pipe.

DETAILED DESCRIPTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It are also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

Embodiments of the invention are illustrated in detail hereinafter with reference to accompanying drawings. It should be understood that specific embodiments described herein are merely intended to explain the invention, but not intended to limit the invention. In accordance with the purposes of this invention, as embodied and broadly described herein, this invention, in certain aspects, relates to a lead-supercritical carbon dioxide intermediate heat exchanger applied to a lead-based reactor supercritical carbon dioxide ($S-CO_2$) cycle power generation system.

Hereinafter, embodiments of the present disclosure will be described in detail with reference to the drawings and examples.

Referring to FIG. 1 to FIG. 5, the present disclosure comprises a cylinder 2 with a closed conical bottom and four modular printed circuit board heat exchangers (modular PCHEs) 1 uniformly arranged around the central axis of the cylinder 2, wherein each modular PCHE 1 is formed by alternate stacking and diffusion welding of a plurality of cold/hot plates etched with semicircular microchannels, the cold/hot plates are made of SS316 stainless steel, and the four modular PCHEs 1 form a $S-CO_2$ central down tube 4 at the center; the top end of the $S-CO_2$ central down tube 4 communicates with a $S-CO_2$ inlet pipe 7 sleeved in the cylinder 2, and the cylinder 2 is provided with a liquid lead inlet channel 8 and a liquid lead outlet channel 9; the cylinder 2 is provided with annular upper and lower vertical partition boards 6, 3 which isolate the liquid lead inlet and outlet channels 8, 9 on and below the PCHEs 1 respectively; the upper end of the modular PCHE 1 is provided with a $S-CO_2$ outlet pipe 12 and a liquid lead inlet pipe 13, and the lower end is provided with a $S-CO_2$ inlet pipe 16 and a liquid lead outlet pipe 17; the $S-CO_2$ outlet pipes 12 and the $S-CO_2$ inlet pipes 16 are positioned inside the upper and lower vertical partition boards 6, 3 respectively and communicate with the $S-CO_2$ central down tube 4 and the $S-CO_2$ outlet channel 5 respectively, and the liquid lead inlet pipes 13 and the liquid lead outlet pipes 17 are positioned outside the upper and lower vertical partition boards 6, 3 respectively and communicate with the liquid lead inlet channel 8 and the liquid lead outlet channel 9 respectively; the upper part of the cylinder 2 is provided with a S-CO$_2$ outlet channel 5, the S-CO$_2$ outlet channel 5 is located at the tops of the modular PCHEs 1, the inside of the liquid lead inlet channel 8 and the outside of the S-CO$_2$ inlet pipe 7, and S-CO$_2$ flowing out of the S-CO$_2$ outlet pipe 12 flows upward along the S-CO$_2$ outlet channel 5 and finally exits the S-CO$_2$ horizontal outlet pipe at the top of the S-CO$_2$ outlet channel 5; an upper horizontal partition board is arranged between the upper ends of adjacent modular PCHEs 1, a lower horizontal partition board is arranged between the lower ends of adjacent modular PCHEs 1, the upper vertical partition board 6 divides the upper horizontal partition board into an upper inner horizontal partition board 10 and an upper outer horizontal partition board 11, and the lower vertical partition board 3 divides the lower horizontal partition board into a lower inner horizontal partition board 14 and a lower outer horizontal partition board 15.

Figure 1:
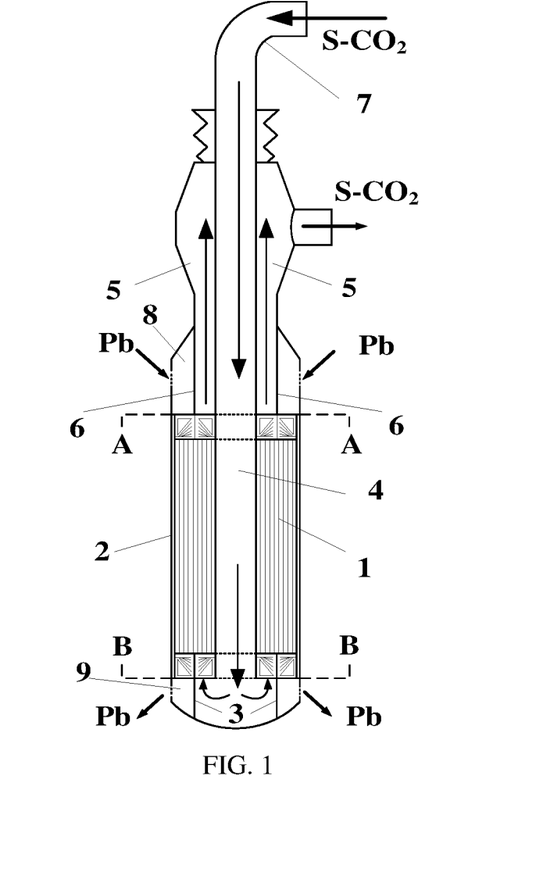
FIG. 1 is a structural diagram of a lead/S-CO$_2$ intermediate heat exchanger according to the present disclosure.
Figure 2:
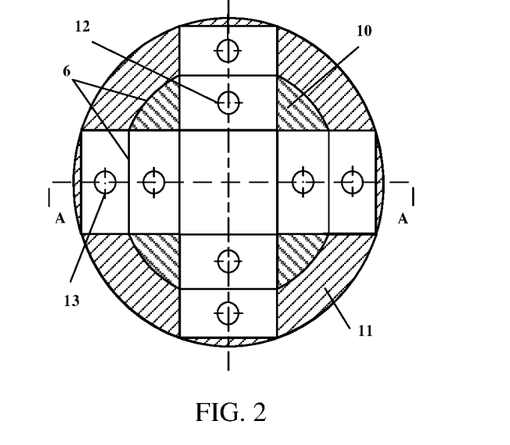
FIG. 2 is a sectional view of A-A in FIG. 1.
Figure 3:
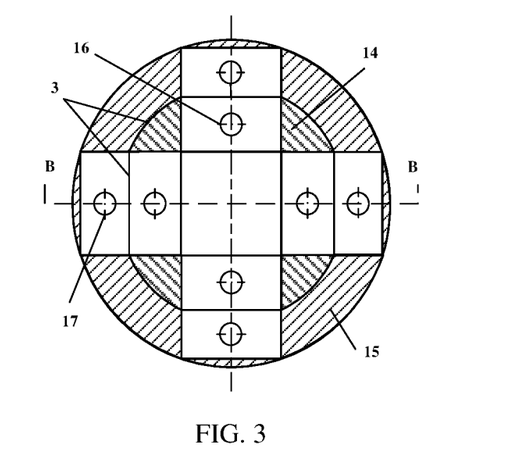
FIG. 3 is a sectional view of B-B in FIG. 1.
Figure 4:
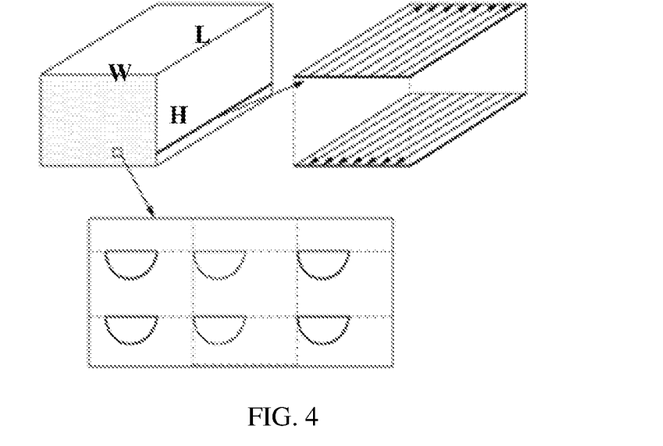
FIG. 4 is a structural diagram of a heat exchange section of modular PCHE.
Figure 5:
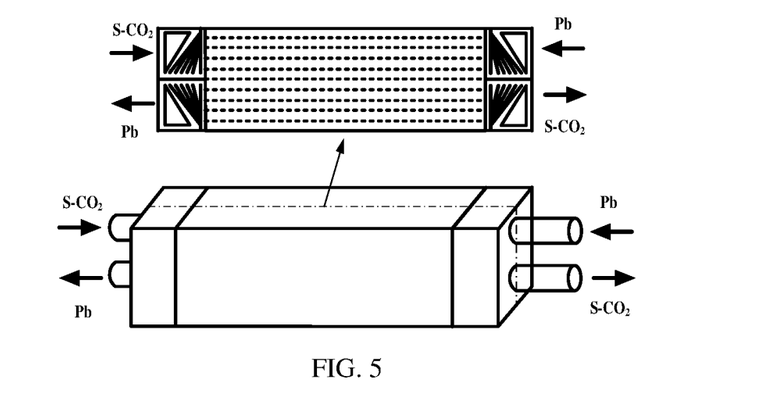
FIG. 5 shows the overall appearance structure of the modular PCHE.

The cross sections of the S-CO$_2$ central down tube 4 and the S-CO$_2$ inlet pipe 7 are square, and the bottom end of the S-CO$_2$ central down tube 4 is connected with a S-CO$_2$ cavity composed of the lower vertical partition board 3, the bottom of the cylinder 2 and the lower inner horizontal partition boards 14.

The liquid lead inlet channel 8 is arranged at the tops of the modular PCHEs 1 and is formed by welding the upper vertical partition board 6, the cylinder 2 and the upper outer horizontal partition boards 11.

The liquid lead outlet channel 9 is arranged at the bottom of the cylinder 2 and is formed by welding the cylinder 2, the lower outer horizontal partition boards 15 and the lower vertical partition board 3.

Figure 6:
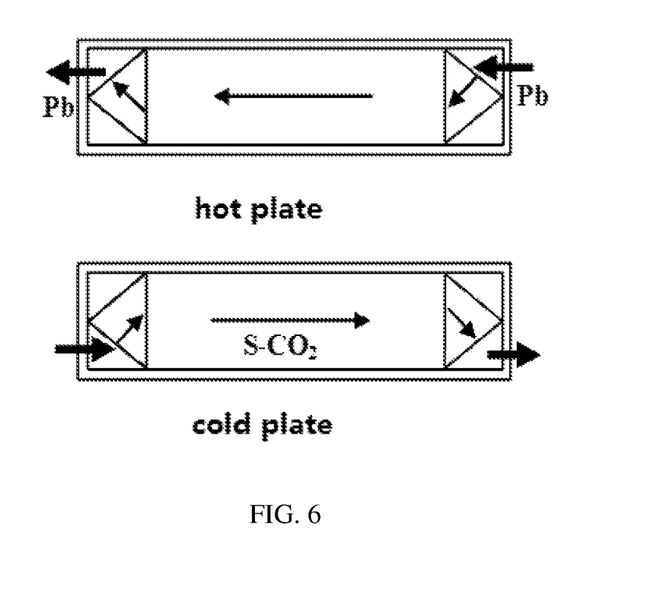
FIG. 6 is a schematic diagram of the structure and internal fluid flow path of hot side heat exchange plates and cold side heat exchange plates.

Referring to FIG. 6, the inlet end of the modular PCHE 1 is provided with a current equalizer, the outlet end is provided with a current collector, the current equalizer at the upper end is connected with the liquid lead inlet pipe 13, the current equalizer at the lower end is connected with the S-CO$_2$ inlet pipe 16, the current collector at the upper end is connected with the S-CO$_2$ outlet pipe 12, and the current collector at the lower end is connected with the liquid lead outlet pipe 17.

The working flow of the present disclosure is as follows:

High-pressure S-CO$_2$ fluid coming out of the S-CO$_2$ circulation subsystem first passes through the S-CO$_2$ inlet pipe 7, enters the intermediate heat exchanger along the square S-CO$_2$ central down tube 4, then enters the current equalizers of the four modular PCHEs upward after reaching the conical bottom of the intermediate heat exchanger, and flows upward along the microchannels on the cold side heat exchange plates of the modular PCHEs to absorb the heat transferred by liquid lead on the hot side heat exchange plates, then S-CO$_2$ is collected by the current collectors at the other ends of the modular PCHEs and enters the S-CO$_2$ outlet channel 5, and finally S-CO$_2$ flows upward to leave the intermediate heat exchanger through the S-CO$_2$ horizontal outlet pipe. Since the lead/S-CO$_2$ intermediate heat exchanger is arranged in a core vessel of the lead-based reactor and immersed in the core coolant liquid lead, the high-temperature and low-pressure liquid lead flows into the liquid lead inlet channel 8 from the liquid lead inlet duct outside the cylinder 2 of the intermediate heat exchanger, then enters the microchannels on the hot side heat exchange plates from top to bottom through the current equalizers of the modular PCHEs for heat exchange, after transferring heat to the S-CO$_2$ on the other side, merges through the current collectors at the lower ends of the modular PCHEs, enters the lead outlet channel 9, and then flows out of the intermediate heat exchanger through the liquid lead outlet duct outside the cylinder 2 of the intermediate heat exchanger, completing heat exchange of liquid lead and S-CO$_2$ in the intermediate heat exchanger.

The following is a specific embodiment.

(1) The design conditions of an inlet and an outlet of the lead/S-CO$_2$ intermediate heat exchanger, the mass flow of the two heat exchange fluids and the pressure drop of the heat exchanger are given, the basic structural parameters of the PCHE, such as the diameter of the microchannels $d_c$, the thickness of the heat exchange plates t and the spacing of the microchannels $p_c$, are selected, and Table 1 is a list of the design operating condition parameters of the lead/S-CO$_2$ intermediate heat exchanger.

TABLE 1

| Parameters of Design Operating Conditions of Lead/S—CO$_2$ Intermediate Heat Exchanger | | | |
|---|---|---|---|
| Item | Value | Item | Value |
| Total heat transfer power/MW | 22.58 | Inlet pressure of S—CO$_2$/kPa | 24991 |
| Inlet temperature of lead/° C. | 560 | Pressure drop of S—CO$_2$/kPa | <8 |
| Outlet temperature of lead/° C. | 440 | Mass flow of S—CO$_2$/kg · s$^{-1}$ | 97.21 |
| Mass flow of lead/kg · s$^{-1}$ | 959.66 | Diameter of microchannel $d_c$/mm | 2 |
| Inlet temperature of S—CO$_2$/° C. | 364.12 | Thickness of heat exchange plate t/mm | 1.5 |
| Outlet temperature of S—CO$_2$/° C. | 550 | Spacing of microchannel $p_c$/mm | 2.4 |

(2) The total number of heat exchange microchannels on the cold and hot plates of the lead/S-CO$_2$ intermediate heat exchanger are given.

(3) Assume that: (a) the total mass flow of S-CO$_2$ is uniformly distributed in all microchannels; (b) the temperature of the plates in the heat exchanger is periodically distributed (cold and hot in turn); (c) the geometric parameters of the cold and hot plates are the same, and the geometric parameters of the microchannels are the same; (d) the fluid temperature distribution on the cross section of each axial position is uniform; (e) the heat conduction area in the channels is equal to the convective heat transfer area; (f) the heat conduction distance is equal to the distance between the cold and hot plates (namely the thickness t of the heat exchange plate), and heat conduction is simplified to the heat conduction between two plates. Based on these assumptions, it is concluded that the heat exchange conditions between all cold and hot microchannels are the same, so only the heat exchange between one pair of microchannels needs to be considered.

(4) The lead/S-CO$_2$ intermediate heat exchanger is divided into several sub-heat exchangers in an equicaloric mode by the method of limited segmentation, and the enthalpy values at the inlet and outlet of each sub-heat exchanger are obtained according to the design operating condition parameters of the lead/S-CO$_2$ intermediate heat exchanger. An initial value of pressure drop is assigned to each sub-heat exchanger, and initial values of condition parameters at the inlet and outlet of each sub-heat exchanger and an initial value of total pressure drop of the lead/S-CO$_2$ intermediate heat exchanger are obtained.

(5) The Nusselt number Nu of turbulent S-CO$_2$ in the linear semicircular microchannel of the first sub-heat exchanger is calculated by using a Gnielinski correlation equation, as shown in Equation (1):

$$Nu = \frac{\frac{f_c}{8}(Re-1000)Pr}{1+12.7\left(Pr^{\frac{2}{3}}-1\right)\sqrt{\frac{f_c}{8}}} \quad (1)$$

$(Re > 2300)$ wherein Nu is Nusselt number; Re is Reynolds number; Pr is Prandtl number; and $f_c$ is Moody friction factor, which is defined as follows:

$$f_c = \left(\frac{1}{1.8\log Re - 1.5}\right)^2 \quad (2)$$

Equations (1) and (2) are valid in the range where Re is less than $5\times10^6$ and Pr is 0.5-2000. Re is defined as follows:

$$Re = \frac{vd_{eq}}{\gamma} \quad (3)$$

wherein v is the flow rate of S-$CO_2$; $\gamma$ is the kinematic viscosity of S-$CO_2$; and $d_{eq}$ is the hydraulic diameter of the semicircular microchannels and is calculated by Equation (4):

$$d_{eq} = \frac{4\pi d_c^2}{8\left(\pi\frac{d_c}{2}+d_c\right)} \quad (4)$$

For laminar flow, Hesselgraves suggested that Nu of S-$CO_2$ be 4.089, but Nu calculated by the Gnielinski equation when Re is 2300 is not equal to 4.089, which will lead to discontinuity of NU calculation results and cause iterative divergence of the program. Therefore, for the transition flow region with Re being 2300 to 5000, Nu of S-$CO_2$ can be calculated by Equation (5):

$$Nu = 4.089 + \frac{Nu_{G|Re=5000}-4.089}{5000-2300}(Re-2300) \quad (5)$$

wherein $Nu_{G|Re}=5000$ is the Nu value calculated by the Gnielinski equation when Re is 5000.

(6) Nu of liquid lead in the first sub-heat exchanger can be calculated according to Equation (6):

$Nu = 5+0.025(Re\cdot Pr)^{0.8}$ (6)

(7) According to Equation (7), the convective heat transfer coefficients h of liquid lead and S-$CO_2$ heat transfer fluids are obtained respectively:

$$h = \frac{Nu\cdot\lambda}{d_{eq}} \quad (7)$$

wherein $\lambda$ is the thermal conductivity of each heat transfer fluid at the qualitative temperature.

(8) The total convective heat transfer coefficient $h_1$ and the length $L_1$ of the first sub-heat exchanger are calculated by Equations (8) and (9):

$$h_1 = \frac{1}{\frac{1}{h_h}+\frac{t}{\lambda}+\frac{1}{h_c}} \quad (8)$$

$$L_1 = \frac{q_1}{h_1\left(\pi\frac{d_c}{2}+d_c\right)(T_{avh}-T_{avc})} \quad (9)$$

wherein $h_h$ and $h_c$ are the convective heat transfer coefficients of the hot side fluid and the cold side fluid of the first sub-heat exchanger respectively; $\lambda$ is the thermal conductivity of the material of the heat exchanger; $q_1$ is the heat exchange amount of the first sub-heat exchanger; and $T_{avh}$ and $T_{avc}$ are the average temperatures of the hot side fluid and the cold side fluid of the first sub-heat exchanger.

(9) The pressure loss of the first sub-heat exchanger is calculated, which consists of two parts: one is the local head loss and the other is the friction resistance loss along the way. The local pressure loss of the linear microchannel PCHE mainly occurs at the inlet and outlet of the microchannel, and is calculated by Equation (10):

$$\Delta P = C\rho\frac{v^2}{2} \quad (10)$$

wherein C is the non-dimensional local head loss coefficient, 0.5 at the inlet and 1.0 at the outlet; $\rho$ is the local fluid density; and v is the local fluid velocity.

The pressure drop caused by friction resistance along the way is calculated by Equation (11):

$$\Delta P = f\frac{L_1}{d_{eq}}\rho\frac{v^2}{2} \quad (11)$$

wherein f is the resistance coefficient along the way, which needs to be obtained through empirical correlation.

(10) The calculation of the resistance coefficient f along the way needs to cover all possible flow patterns, from laminar flow to stable turbulence, and the boundary Re of different flow patterns needs to be accurately determined first. When the S-$CO_2$ fluid is in the transition flow state from laminar flow to turbulent flow, f will change sharply along with Re, and the boundary Reynolds number $Re_0$ of laminar flow and transition flow is calculated by a Hagen-Poiseuille equation, expressed as Equation (12):

$$Re_0 = 754e^{\frac{0.0065}{\Delta}} \quad (12)$$

wherein $\Delta$ is the relative roughness of a pipe wall (the ratio of surface roughness to pipe diameter). The applicable range of Equation (12) is $\Delta>0.007$, if $\Delta<0.007$, $Re_0=2000$. For a laminar flow ($Re<Re_0$) region, f is calculated by Equation (13):

$$f = \frac{64}{\Delta} \quad (13)$$

When Re is greater than $Re_0$, S-$CO_2$ enters the transition flow state, f begins to decrease, but the magnitude of decrease becomes smaller and smaller, and gradually increases after f reaches the minimum value at a certain point, and the Reynolds number at this inflection point is defined as $Re_1$, which is calculated by a Samoilenko equation:

$$Re_1 = \frac{1160}{\Delta} \tag{14}$$

The applicable range of Equation (14) is $\Delta > 0.007$, if $\Delta < 0.007$, $Re_1 = 2000$. f can be calculated by Equation (15) in the case of $Re_0 < Re < Re_1$:

$$f = 4.4Re^{-0.595}e^{\frac{0.00275}{\Delta}} \tag{15}$$

The upper limit Reynolds number $Re_2$ for the transition flow region wherein f increases continuously is defined as:

$$Re_2 = 2090\left(\frac{1}{\Delta}\right)^{0.0635} \tag{16}$$

The increasing f in the transition flow range ($Re_1 < Re < Re_2$) can be calculated by Equation (17):

$$f = (7.244(Re_2)^{-0.643} - f^*)e^{\{-[0.0017(Re_2 - Re)]^2\}} + f^* \tag{171}$$

When $\Delta < 0.007$, $f^* = f_1$ in the above Equation, if $\Delta > 0.007$, $f^* = f_1 - 0.0017$; $f_1$ is the friction resistance coefficient when Reynolds number is $Re_1$, which is calculated by Equations (18) and (19):

$$f_1 = 0.032 \; (\Delta < 0.007) \tag{18}$$

$$f_1 = 0.075 - \frac{0.0109}{\Delta^{0.286}} \; (\Delta > 0.007) \tag{19}$$

S-CO$_2$ stable turbulence is generated when Reynolds number is $Re_3$, and the boundary Reynolds number of the turbulence development stage and the stable turbulence is defined as $Re_3$, which is calculated by Equation (20):

$$Re_3 = 441.19\Delta^{-1.1772}{}_{10} \tag{20}$$

For the turbulence development stage ($Re_2 < Re < Re_3$), the Colebrook-Whit correlation is used to calculate f:

$$f = \frac{1}{2\log_{10}\left(\frac{2.51}{Re\sqrt{f}} + \frac{\Delta}{3.7}\right)^2} \tag{21}$$

For a stable turbulence region ($Re > Re_3$), Idelchik suggested using a Prandtl-Nikuradse equation to calculate f, but the f obtained by the Prandtl-Nikuradse equation at some Reynolds numbers and relative roughness is not smooth enough. Therefore, f of S-CO$_2$ in a stable turbulence region should be the value of the Colebrook-Whit equation when Reynolds number is $Re_3$.

(11) The pressure drop of the first sub-heat exchanger is calculated, if the calculated value is equal to the assigned initial value of the pressure drop of the sub-heat exchanger, the calculation of the first sub-heat exchanger is completed, otherwise, the calculated pressure drop value is taken as the initial value of the pressure drop, steps (4) to (10) are repeated to calculate the pressure drop of the first sub-heat exchanger again until the relative error between the initial value of the pressure drop and the calculated pressure drop value meets the requirements, then the iterative solution of the pressure drop of the first sub-heat exchanger is completed, and the outlet working condition, the length of a heat exchange tube $L_1$ and the pressure drop of the first sub-heat exchanger are obtained.

(12) According to the outlet working condition of the first sub-heat exchanger, the second sub-heat exchanger is iteratively solved by adopting a method similar to that used on the first sub-heat exchanger to obtain the inlet and outlet parameters, pressure drop and tube length $L_2$ of the second heat exchanger, and the inlet and outlet parameters, pressure drops and tube lengths $L_i$ of other sub-heat exchangers are obtained by analogy.

(13) The total length and total pressure drop of the lead/S-CO$_2$ intermediate heat exchanger can be obtained by summing the tube lengths and pressure drops of all the sub-heat exchangers.

(14) If the relative error between the calculated total pressure drop of the lead/S-CO$_2$ intermediate heat exchanger and the initial value of the total pressure drop of the lead/S-CO$_2$ intermediate heat exchanger given in step (4) does not meet the requirements, the calculated total pressure drop value is taken as the initial value of the total pressure drop of the lead/S-CO$_2$ intermediate heat exchanger, steps (5) to (13) are repeated to calculate the total pressure drop value of the lead/S-CO$_2$ intermediate heat exchanger again until the relative error of the calculated total pressure drop value and the initial value of the total pressure drop meets the requirements, and then iteration converges.

(15) Whether the final iterative convergence total pressure drop value of the lead/S-CO$_2$ intermediate heat exchanger meets the requirements of Table 1 for pressure drop is judged, if not, the total number of the heat exchange microchannels on the cold and hot plates of the lead/S-CO$_2$ intermediate heat exchanger in step (2) is adjusted, and steps (3) to (14) are repeated until the calculated total pressure drop value of the lead/S-CO$_2$ intermediate heat exchanger meets the requirements.

(16) The size of the PCHE heat exchange plates is not randomly selected, currently, the maximum width of the PCHE heat exchange plates is 600 mm, the maximum height is 600 mm, and the maximum length is 1500 mm. If a splitter package is taken into account, the maximum length of the heat exchange section of the heat exchanger is 1350 mm. According to the total number of the heat exchange microchannels, the total length and the basic structural parameters of PCHE of the lead/S-CO$_2$ intermediate heat exchanger, the geometric dimension of the intermediate heat exchanger is calculated. The unit thickness $t_n$ of PCHE is the sum of the thickness $t_{hs}$ of the hot side plates and the thickness $t_{cs}$ of the cold side plates, and the calculation is carried out by Equation (22):

$$t_n = t_{cs} + t_{hs} \tag{22}$$

The calculation method of geometric parameters such as tube length L, height H and width W of modular PCHE is as follows:

$$L = l_n \cdot n_n \tag{23}$$

$$H = n_{pl} \cdot t_n \quad (24)$$

$$W = (n_c + 2) \cdot p_c \quad (25)$$

wherein $l_n$ is the tube length of the sub-heat exchanger; $n_n$ is the number of the discrete sub-heat exchangers; $n_{pl}$ is the number of the hot or cold plates; $n_c$ is the number of the microchannels on a single cold plate; and $p_c$ is the width/mm of the channels.

(17) The geometric dimension parameters of the four modular PCHEs are calculated and determined, as shown in Table 2.

(18) The four modular PCHEs are vertically arranged in the circumferential direction of the cylinder 2. A complete intermediate heat exchanger can be assembled by welding the horizontal and vertical partition boards at the upper and lower ends of the modular PCHEs to form the heat exchange fluid channels, punching holes in the cylinder, and installing the S-CO$_2$ inlet and outlet pipes. The geometric structure parameters of the lead/S-CO$_2$ intermediate heat exchanger are determined according to the geometric size design of the modular PCHE, as shown in Table 2.

TABLE 2

Design Results of Intermediate Heat Exchanger

| Design Item | Value | Design Item | Value |
|---|---|---|---|
| Number of cold side heat exchange plates in modular PCHE | 100 | Length of Modular PCHE/mm | 812.3 |
| Number of hot side heat exchange plates in modular PCHE | 100 | Diameter of cylinder of intermediate heat exchanger/mm | 948.68 |
| Number of channels on each plate | 124 | Height of heat exchange section of intermediate heat exchanger/mm | 950 |
| Height of modular PCHE/mm | 300 | Total height of intermediate heat exchanger/mm | 1300 |
| Width of modular PCHE/mm | 300 | Number of required intermediate heat exchangers/piece | 4 |

(19) The parameters used in the above calculation are defined as follows:

| | |
|---|---|
| C | Non-dimensional local head loss coefficient |
| $d_c$ | Diameter of PCHE microchannels, m |
| $d_{eq}$ | Hydraulic diameter of semicircular microchannels, m |
| $f_c$ | Moody friction factor |
| H | Height of heat exchanger, m |
| h | Convective heat-transfer coefficient, W · (m$^2$ · K)$^{-1}$ |
| L | Length of heat exchanger, m |
| $l_n$ | Tube length of sub-heat exchanger, m |
| $n_c$ | Number of microchannels on a single heat exchanger plate, piece |
| $n_n$ | Number of discrete sub-heat exchangers, piece |
| $n_{pl}$ | Number of hot side heat exchange plates or cold side heat exchange plates, piece |
| Nu | Nusselt number |
| $P_c$ | Width of channels, m |
| $P_r$ | Prandtl number |
| q | Heat exchange amount, W |
| Re | Reynolds number |
| $T_{avh}$ | Average temperature of hot side fluid of heat exchanger, K |
| $T_{avc}$ | Average temperature of cold side fluid of heat exchanger, K |
| $t_{cs}$ | Thickness of cold side heat exchange plate, m |
| $t_{hs}$ | Thickness of hot side heat exchange plate, m |
| $t_n$ | Unit thickness of PCHE, m |
| v | heat exchange fluid velocity, m · s$^{-1}$ |
| W | Width of heat exchanger, m |
| λ | Heat conductivity coefficient/W · (m · K)$^{-1}$ |
| ρ | Fluid density/kg · m$^{-3}$ |

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A lead-supercritical carbon dioxide intermediate heat exchanger, comprising a cylinder (2) and four modular printed circuit board heat exchangers (PCHEs) wherein the modular PCHEs are formed by alternate stacking of a plurality of cold/hot plates, the PCHEs are uniformly arranged around a central axis of the cylinder (2), wherein the four modular PCHEs (1) form a S-CO$_2$ central down tube (4) at a center, a top end of the S-CO$_2$ central down tube (4) communicates with a S-CO$_2$ inlet pipe (7) sleeved in the cylinder (2), and the cylinder (2) is provided with a liquid lead inlet channel (8) and a liquid lead outlet channel (9); the cylinder (2) is provided with annular upper and lower vertical partition boards (6, 3) which isolate the liquid lead inlet and outlet channels (8, 9) on and below the PCHEs (1) respectively; an upper end of each modular PCHE (1) is provided with a S-CO$_2$ outlet pipe (12) and a liquid lead inlet pipe (13), and a lower end is provided with a S-CO$_2$ inlet pipe (16) and a liquid lead outlet pipe (17); and the S-CO$_2$ outlet pipes (12) and the S-CO$_2$ inlet pipes (16) are positioned inside the upper and lower vertical partition boards (6, 3) respectively and communicate with the S-CO$_2$ central down tube (4) and a S-CO$_2$ outlet channel (5) respectively, and the liquid lead inlet pipes (13) and the liquid lead outlet pipes (17) are positioned outside the upper and lower vertical partition boards (6, 3) respectively and communicate with the liquid lead inlet channel (8) and the liquid lead outlet channel (9) respectively.

2. The lead-supercritical carbon dioxide intermediate heat exchanger according to claim 1, wherein the inlet end of the modular PCHE (1) is provided with a current equalizer, the outlet end is provided with a current collector, the current equalizer at the upper end is connected with the liquid lead inlet pipe (13), the current equalizer at the lower end is connected with the S-CO$_2$ inlet pipe (16), the current collector at the upper end is connected with the S-CO$_2$ outlet pipe (12), and the current collector at the lower end is connected with the liquid lead outlet pipe (17).

3. The lead-supercritical carbon dioxide intermediate heat exchanger according to claim 2, wherein the upper part of the cylinder (2) is provided with the S-$CO_2$ outlet channel (5), the S-$CO_2$ outlet channel (5) is located at the tops of the modular PCHEs (1), an inside of the liquid lead inlet channel (8) and an outside of the S-$CO_2$ inlet pipe (7), and S-$CO_2$ flowing out of the S-$CO_2$ outlet pipe (12) flows upward along the S-$CO_2$ outlet channel (5) and finally exits a S-$CO_2$ horizontal outlet pipe at the top of the S-$CO_2$ outlet channel (5).

4. The lead-supercritical carbon dioxide intermediate heat exchanger according to claim 3, wherein the bottom of the cylinder (2) is a closed conical structure.

5. The lead-supercritical carbon dioxide intermediate heat exchanger according to claim 4, wherein an upper horizontal partition board is arranged between the upper ends of adjacent modular PCHEs (1), a lower horizontal partition board is arranged between the lower ends of adjacent modular PCHEs (1), the upper vertical partition board (6) divides the upper horizontal partition board into an upper inner horizontal partition board (10) and an upper outer horizontal partition board (11), and the lower vertical partition board (3) divides the lower horizontal partition board into a lower inner horizontal partition board (14) and a lower outer horizontal partition board (15).

6. The lead-supercritical carbon dioxide intermediate heat exchanger according to claim 5, wherein a cross section of the S-$CO_2$ central down tube (4) and the S-$CO_2$ inlet pipe (7) are square, and the bottom end of the S-$CO_2$ central down tube (4) is connected with a S-$CO_2$ cavity composed of the lower vertical partition board (3), the bottom of the cylinder (2) and the lower inner horizontal partition boards (14).

7. The lead-supercritical carbon dioxide intermediate heat exchanger according to claim 6, wherein the liquid lead inlet channel (8) is arranged at the tops of the modular PCHEs (1) and is formed by welding the upper vertical partition board (6), the cylinder (2) and the upper outer horizontal partition boards (11).

8. The lead-supercritical carbon dioxide intermediate heat exchanger according to claim 7, wherein the liquid lead outlet channel (9) is arranged at the bottom of the cylinder (2) and is formed by welding the cylinder (2), the lower outer horizontal partition boards (15) and the lower vertical partition board (3).

* * * * *